United States Patent
Kang et al.

(10) Patent No.: US 8,663,836 B2
(45) Date of Patent: Mar. 4, 2014

(54) COMPOSITE ANODE ACTIVE MATERIAL, METHOD OF PREPARING THE COMPOSITE ANODE ACTIVE MATERIAL, AND LITHIUM BATTERY INCLUDING THE COMPOSITE ANODE ACTIVE MATERIAL

(75) Inventors: Ho-suk Kang, Seoul (KR); Jeong-hee Lee, Seongnam-si (KR); Yoon-chul Son, Hwaseong-si (KR); Jeong-na Heo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 950 days.

(21) Appl. No.: 12/725,674

(22) Filed: Mar. 17, 2010

(65) Prior Publication Data

US 2010/0261050 A1    Oct. 14, 2010

(30) Foreign Application Priority Data

Apr. 9, 2009    (KR) .................. 10-2009-0030954

(51) Int. Cl.
*H01M 4/583* (2010.01)
*B05D 5/12* (2006.01)
*H01M 4/54* (2006.01)
*H01M 2/08* (2006.01)

(52) U.S. Cl.
USPC .............. 429/185; 427/78; 429/219; 977/742

(58) Field of Classification Search
None
See application file for complete search history.

(56) References Cited

U.S. PATENT DOCUMENTS

| | | | |
|---|---|---|---|
| 6,183,714 B1 * | 2/2001 | Smalley et al. | 423/447.3 |
| 7,153,903 B1 * | 12/2006 | Barraza et al. | 524/847 |
| 7,411,019 B1 * | 8/2008 | Bley | 524/847 |
| 2006/0038299 A1 * | 2/2006 | Hirakata et al. | 257/773 |

OTHER PUBLICATIONS

Chen, George et al., Carbon Nanotube and Polypyrrole Composites: Coating and Doping, Jan. 12, 2000, Advanced Materials, 12 No. 7, pp. 522-526.*

* cited by examiner

*Primary Examiner* — Patrick Ryan
*Assistant Examiner* — Christopher Domone
(74) *Attorney, Agent, or Firm* — Cantor Colburn LLP

(57) ABSTRACT

A composite anode active material, a method of preparing the composite anode active material, and a lithium battery including the lithium battery. According to the method of preparing the composite anode active material, carbon nanotubes are formed on a Si particle without a separate operation of applying a catalyst. Furthermore, high adherence is provided between the Si particle and carbon nanotubes, and therefore the composite anode active material is used as an anode material of the lithium battery.

10 Claims, 2 Drawing Sheets

Si PARTICLE        POLYMERIZE Si + PYRROL        GROW CARBON NANOTUBES

COMPOSITE ANODE ACTIVE MATERIAL, METHOD OF PREPARING THE COMPOSITE ANODE ACTIVE MATERIAL, AND LITHIUM BATTERY INCLUDING THE COMPOSITE ANODE ACTIVE MATERIAL

CROSS-REFERENCE TO RELATED APPLICATIONS

This application claims the benefit of Korean Patent Application No. 10-2009-0030954, filed on Apr. 9, 2009, in the Korean Intellectual Property Office, the disclosure of which is incorporated herein in its entirety by reference.

BACKGROUND OF THE INVENTION

1. Field of the Invention

One or more embodiments of the present invention relate to a composite anode active material, a method of preparing the composite anode active material, and a lithium battery including the composite anode active material.

2. Description of the Related Art

As portable electronic devices become lighter and have increasingly high performance, batteries used therein are required to have high capacity and high output power. In order for a battery to have high capacity, an active material having high capacity or a high charging voltage of the battery is used.

A metal or an alloy is mainly used as a high-capacity active material. For example, silicon (Si) may be used as a high-capacity active material, and has a high capacitance density 10 times that of graphite. However, lifetime characteristics may be reduced due to volume expansion during charging/discharging processes.

To overcome this, research has been conducted in order to combine Si with carbon nanotubes to improve charging and discharging properties and electrical conductivity properties of lithium batteries.

SUMMARY OF THE INVENTION

One or more embodiments of the present invention include a composite anode active material that is formed by combining Si with carbon nanotubes by using a simple process.

One or more embodiments of the present invention include a method of preparing the composite anode active material.

One or more embodiments of the present invention include a lithium battery including the composite anode active material.

Additional aspects will be set forth in part in the description which follows and, in part, will be apparent from the description, or may be learned by practice of the presented embodiments.

According to one or more embodiments of the present invention, a composite anode active material includes a Si particle; a carbon layer formed on a surface of the Si particle; and carbon nanotubes formed on the carbon layer.

According to another aspect of the present invention, the carbon layer may include at least one of the group consisting of a carbonized layer and a carbon particle.

According to one or more embodiments of the present invention, a method of preparing a composite anode active material includes dispersing and micellizing a Si particle together with a polymerizable monomer in an organic solvent, thereby forming a dispersion solution; forming a carbon layer on the Si particle by applying a catalyst to the dispersion solution in which the Si particle is micellized, polymerizing the polymerizable monomer, and drying the polymerization product; sintering the Si particle on which the carbon layer is formed; and growing carbon nanotubes on the Si particle on which the carbon layer is formed, by providing a vaporized carbonaceous material.

According to another embodiment of the present invention, the sintering may be performed at a temperature equal to or greater than 500° C. under an inert atmosphere.

According to another aspect of the present invention, the polymerizable monomer may include at least one selected from the group consisting of a pyrrol-based monomer, an acetylene-based monomer, a thiopene-based monomer, an aniline-based monomer, a fluorine-based monomer, an alkylthiopene-based monomer, a naphthalene-based monomer and a divinylbenzene-based monomer.

According to another aspect of the present invention, the catalyst may include a catalyst for polymerization and a catalyst for forming carbon nanotubes.

According to another aspect of the present invention, the catalyst may include at least one metal selected from the group consisting of nickel (Ni), cobalt (Co), iron (Fe), platinum (Pt), gold (Au), aluminum (Al), chromium (Cr), copper (Co), magnesium (Mg), manganese (Mg), molybdenum (Mo), rhodium (Rh), silicon (Si), tantalum (Ta), titanium (Ti), tungsten (W), uranium (U), vanadium (V), and zirconium (Zr), chlorides thereof, nitrides thereof, and oxides thereof.

According to another embodiment of the present invention, the organic solvent may include at least one selected from the group consisting of methanol, ethanol, isopropanol, butanol, dimethylformamide (DMF), and N-methylpyrrolidone.

According to another embodiment of the present invention, the vaporized carbonaceous material may include at least one selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

According to one or more embodiments of the present invention, a lithium battery includes a cathode; an anode; and an organic electrolyte, wherein the anode includes the composite anode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE EMBODIMENTS

Figure 1:
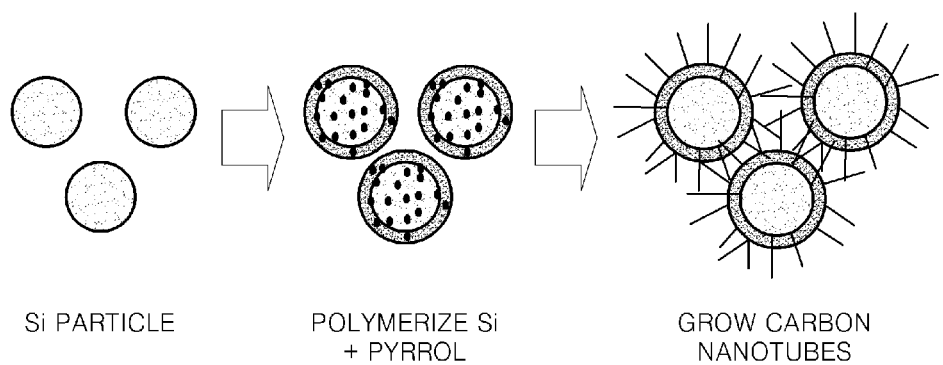
FIG. 1 is a diagram illustrating a method of preparing a composite anode active material, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A composite anode active material according to an embodiment of the present invention includes silicon (Si) particles; a carbon layer formed on a surface of the Si particles; and carbon nanotubes formed on the carbon layer.

The Si particles may have a mean diameter, for example, in the range of about 0.01 to about 1 µm, or about 10 to about 200 nm.

The carbon layer may be formed on the surface of the Si particle, and may include at least one of the group consisting of a carbon particle and a carbonized layer. The carbon layer may be formed by carbonizing a polymer formed on the surface of the Si particle, and carbon nanotubes are grown on the carbon layer.

Hereinafter, a method of preparing the composite anode active material according to an embodiment of the present invention will be described in greater detail.

A composite anode active material according to an embodiment is formed by compositing carbon nanotubes on a surface of a Si particle, wherein the carbon nanotubes may be grown on the surface of the Si particle without a separate process of forming a catalyst.

A method of preparing the composite anode active material according to an embodiment of the present invention includes: dispersing a Si particle together with a polymerizable monomer in an organic solvent, thereby forming a dispersion solution, and performing a micellation process with respect to the Si particle together with the polymerizable monomer; applying a catalyst to the dispersion solution in which the Si particle is micellized and stirring the catalyst and the dispersion solution, polymerizing the polymerizable monomer, and then drying the polymerization product; sintering the dried polymerization product; and providing a vaporized carbonaceous material to grow carbon nanotubes on the Si particle.

The micellation process of the Si particle is performed together with the polymerizable monomer in an organic solvent. Examples of the polymerizable monomer include a pyrrol-based monomer, an acetylene-based monomer, a thiopene-based monomer, an aniline-based monomer, a fluorine-based monomer, an alkylthiopene-based monomer, a naphthalene-based monomer, and a divinylbenzene-based monomer. In the micellation, an appropriate dispersing agent may be used. The type and amount of the dispersing agent may be approximately selected by one of ordinary skill in the art.

FIG. 1 is a diagram illustrating a method of preparing a composite anode active material, according to an embodiment of the present invention. Referring to FIG. 1, the polymerizable monomer forms a thin carbon layer on a surface of the Si particle by polymerization and drying processes. In the middle diagram of FIG. 1, spots indicate catalyst particles.

The Si particles used in the above-described processes is not limited to any particular material. The Si particles may have a mean diameter in the range of about 0.01 to about 1 µm, or in the range of about 10 to about 200 nm.

The organic solvent used in the above-described process may be an alcohol, such as methanol, ethanol, isopropanol, butanol, or the like, or a non-alcoholic solvent, such as dimethylformamide (DMF) or N-methylpyrrolidone (NMP). The alcohols may be used alone, or used together with dimethylformamide or N-methylpyrrolidone in order to improve dispersion or transparency.

The polymerizable monomer is maintained in a state in which the polymerizable monomer is dispersed in the organic solvent, and thus the polymerizable monomer is combined with the Si particle in the organic solvent to form a micelle having a spherical shape.

Then, the catalyst is applied to the dispersion solution in which the Si particle is micellized. Thus, the catalyst functions as an oxidation catalyst of the polymerizable monomer, and simultaneously functions as a catalyst for forming carbon nanotubes. The catalyst is not limited to any particular material as long as it is well known to one of ordinary skill in the art. For example, the catalyst may include at least one metal selected from the group consisting of nickel (Ni), cobalt (Co), iron (Fe), platinum (Pt), gold (Au), aluminum (Al), chromium (Cr), copper (Co), magnesium (Mg), manganese (Mg), molybdenum (Mo), rhodium (Rh), silicon (Si), tantalum (Ta), titanium (Ti), tungsten (W), uranium (U), vanadium (V), and zirconium (Zr), a chloride thereof, a nitride thereof, or an oxide thereof. The catalyst may function as an oxidation catalyst for polymerization of the polymerizable monomer. Then, a catalyst component which is formed in a carbon layer or a carbon particle after a polymerized polymer is carbonized may be used as a catalyst for growing carbon nanotubes.

The catalyst is applied to perform a polymerization process whereby the polymerizable monomer is polymerized, and then the polymerization product is dried. Then, as illustrated in FIG. 1, a layer is formed on a surface of the micellized Si particle, wherein the layer includes a polymer and the catalyst. The polymerization process may be performed for a period of time at a heating temperature, for example, for a period of about 0.1 to about 10 hours at a temperature of about 30 to about 150° C.

The Si particle on which the layer including the polymer and the catalyst is formed is sintered. The polymer is carbonized in the sintering operation. The sintering process may be performed at a temperature equal to or greater than 500° C. under an inert atmosphere. For example, the sintering temperature may be in the range of about 700 to about 1500° C., and the inert atmosphere may be a nitrogen atmosphere, an argon atmosphere, or a helium atmosphere. The effect of the present embodiment is obtained when the sintering process is performed for about 0.1 to about 12 hours.

In the sintering process, the polymer is carbonized in the carbon layer, and a metal particle, constituting a catalyst particle, remains on the surface of the Si particle. Without a separate process of applying a catalyst, the polymer is carbonized, and simultaneously the catalyst particle may be formed on the surface of the Si particle.

Then, carbon nanotubes may be grown from the catalyst particle formed on the surface of the Si particle. The carbon nanotubes may be grown using a thermal vaporization method. A vaporized carbonaceous material used as a source of a carbon-based material contacts a catalyst for forming carbon nanotubes on the Si particle, and is thermally decomposed, thereby growing carbon nanotubes. The vaporized carbonaceous material is not limited to any particular material as long as the material provides carbon, and exists in vapor form at a temperature equal to or greater than 300° C. The vaporized carbonaceous material may be a compound containing carbon, and may be, for example, a compound with a carbon number equal to or less than 6, a compound with a carbon number equal to or less than 4, or a compound with a carbon number equal to or less than 2. For example, the vaporized carbonaceous material may include at least one selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

The vaporized carbonaceous material may be injected to a chamber containing a catalyst, at a fixed pressure. In the chamber, only the vaporized carbonaceous material may exist, or may exist together with an inert gas such as helium, argon, or the like.

Alternatively, hydrogen may be further used together with the vaporized carbonaceous material. Hydrogen may be used in order to control vapor reaction by maintaining a surface of the catalyst particle clean. In addition, about 5 to about 40 volume % hydrogen with respect to the entire volume of the chamber may be used.

According to an embodiment of the present invention, a composite cathode active material prepared using the method of preparing the composite cathode active material described above is provided, and adherence between Si and carbon nanotubes is reinforced in the composite cathode active material. Thus, it is possible to prevent shorts circuits of the carbon nanotubes from occurring due to volume expansion of Si during charge and discharge processes. Accordingly, when the composite cathode active material is used as a cathode active material of a lithium battery, the electrical properties of the lithium battery may be improved.

One or more embodiments of the present invention include a lithium battery including a cathode, an anode and an organic electrolyte, wherein the anode includes the composite anode active material.

The lithium battery is not limited, and may be, for example, a lithium secondary battery, such as a lithium ion battery, a lithium ion polymer battery, a lithium sulfur battery, or the like, or a lithium primary battery.

The cathode includes a current collector and a cathode active material layer formed on the current collector. In order to form the cathode, a cathode active material, a conducting agent, a binder and a solvent may be mixed to prepare a composite cathode active material. A cathode plate may be prepared by coating the composite cathode active material directly on an aluminum collector and drying the material to form a cathode active material layer. Alternatively, the cathode plate may be prepared by casting the composite cathode active material on a separate support and laminating a cathode active material film exfoliated from the support on the aluminum collector to form the cathode active material layer. The method of manufacturing the cathode is obvious to those of ordinary skill in the art, and thus a detailed description thereof will not be provided. Examples of the solvent may include N-methylpyrrolidione, acetone, water, etc., but are not limited thereto.

A compound (lithiated intercalation compound) which allows reversible intercalation and deintercalation of lithium may be used as the cathode active material for forming the cathode active material layer. In particular, the cathode active material may include at least one composite oxide of lithium and a metal selected from the group consisting of cobalt, manganese, nickel, and a combination thereof. Examples of the cathode active material may include compounds represented by the following formulae.

$Li_aA_{1-b}X_bD_2$ (where $0.95 \leq a \leq 1.1$, and $0 \leq b \leq 0.5$); $Li_aE_{1-b}X_bO_2-cD_c$ (where $0.95 \leq a \leq 1.1$, $0 \leq b \leq 0.5$, and $0 \leq c \leq 0.05$); $LiE_{2-b}X_bO_4-cD_c$ (where $0 \leq b \leq 0.5$, and $0 \leq c \leq 0.05$); $Li_aNi_{1-b-c}Co_bB_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_2-\alpha M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_2-\alpha M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_2-\alpha M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_2-\alpha M_2$ (where $0.95 \leq a \leq 1.1$, $0 \leq b \leq 0.5$, $0 \leq c \leq 0.05$, and $0 < \alpha < 2$); $Li_aNi_bE_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiGbO_2$ (where $0.90 \leq a \leq 1.1$, and $0.001 \leq b \leq 0.1$); $Li_aCoGbO_2$ (where $0.90 \leq a \leq 1.1$, and $0.001 \leq b \leq 0.1$); $Li_aMnGbO_2$ (where $0.90 \leq a \leq 1.1$, and $0.001 \leq b \leq 0.1$); $Li_aMn_2GbO_4$ (where $0.90 \leq a \leq 1.1$, and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the formulae listed above, A is selected from the group consisting of nickel (Ni), cobalt (Co), manganese (Mg), and a combination thereof; X is selected from the group consisting of aluminum (Al), nickel (Ni), cobalt (Co), manganese (Mg), chromium (Cr), iron (Fe), magnesium (Mg), strontium (Sr), vanadium (V), a rare earth element, and a combination thereof; D is selected from the group consisting of oxygen (O), fluorine (F), sulfur (S), phosphorus (P), and a combination thereof; E is selected from the group consisting of cobalt (Co), manganese (Mg), and a combination thereof; M is selected from the group consisting of fluorine (F), sulfur (S), phosphorus (P), and a combination thereof; G is selected from the group consisting of aluminum (Al), chromium (Cr), manganese (Mg), iron (Fe), magnesium (Mg), lanthanum (La), cerium (Ce), strontium (Sr), vanadium (V), and a combination thereof; Q is selected from the group consisting of titanium (Ti), molybdenum (Mo), manganese (Mg), and a combination thereof; Z is selected from the group consisting of chromium (Cr), vanadium (V), iron (Fe), scandium (Sc), yttrium (Y), and a combination thereof; and J is selected from the group consisting of vanadium (V), chromium (Cr), manganese (Mg), cobalt (Co), nickel (Ni), copper (Co), and a combination thereof.

A surface coating layer may be formed on any of these compounds. Alternatively, the cathode active material layer may include a mixture of a compound without a coating layer and a compound on which a coating layer is formed, the compounds being selected from the above group. The coating layer may include at least one compound of a coating element selected from the group consisting of an oxide, hydroxide, oxyhydroxide, oxycarbonate, and hydroxycarbonate of the coating element. The compounds for the coating layer may be amorphous or crystalline. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof.

The coating layer may be formed using a spray coating method, an immersion method, or the like, which does not adversely affect the physical properties of the cathode active material when a compound of such a coating element is used. This is obvious to those of ordinary skill in the art, and thus a detailed description thereof will not be provided.

The binder included in the cathode active material layer functions to strongly bind cathode active material particles together and to a current collector. Specific examples of the binder may include, but are not limited to, polymers, including polyvinyl alcohol, carboxymethyl cellulose, hydroxypropyl cellulose, diacetyl cellulose, polyvinyl chloride, carboxylated polyvinyl chloride, polyvinyl fluoride, and ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, nylon, and the like.

The conducting agent included in the cathode active material layer is used to provide conductivity to the cathode. Any electrical conductive material causing no chemical change in batteries may be used. Examples of the conducting agent include carbonaceous materials, such as natural graphite, artificial graphite, carbon black, acetylene black, ketchen black, carbon fibers, and the like; metals such as copper, nickel, aluminum, silver, and the like, in powder or fiber form; and conductive materials, including conductive polymers, such as a polyphenylene derivative, and a mixture thereof.

The current collector may include aluminum (Al), but is not limited thereto.

Similarly to the manufacturing of the cathode plate described above, an anode active material, a conductive material, a binder, and a solvent are mixed to prepare a composite anode active material. The composite anode active material is directly coated on a copper current collector to prepare an anode plate. Alternatively, the composite anode active material is cast on a separate support, and then an anode active material film delaminated from the support is laminated on the copper current collector to prepare an anode plate. The amounts of the anode active material, the conductive material, the binder, and the solvent are the same as those commonly used in a lithium battery.

The composite anode active material obtained using the above-described method may be used as the composite anode active material. The conducting agent, the binder and the solvent in the composite anode active material are the same as those in the composite cathode active material. If required, a plasticizer may be added to the composite cathode active material and the composite anode active material to form pores inside the electrode plates.

A separator may be disposed between the cathode and the anode according to the type of the lithium battery. The separator used in the lithium battery may be any separator that is commonly used for lithium batteries. In one embodiment, the separator may have low resistance to migration of ions in an electrolyte and have a high electrolyte-retaining ability. Examples of the separator include glass fiber, polyester, Teflon, polyethylene, polypropylene, polytetrafluoroethylene (PTFE), and a combination thereof, each of which can be a nonwoven fabric or a woven fabric. In particular, a windable separator including polyethylene, polypropylene or the like can be used for a lithium ion battery. A separator that can retain a large amount of an organic electrolytic solution may be used for a lithium-ion polymer battery. A method of forming these separators will now be described in more detail.

A polymer resin, a filler, and a solvent are mixed to prepare a separator composition. Then, the separator composition may be directly coated on an electrode, and then dried to form a separator film. Alternatively, the separator composition may be cast on a support and then dried to form a separator composition film, and the separator composition film is exfoliated from the support and laminated on an electrode to form a separator film.

The polymer resin is not particularly limited and may be any material that can be used as a binder for an electrode plate. Examples of the polymer resin include vinylidenefluoride/hexafluoropropylene copolymer, polyvinylidenefluoride, polyacrylonitrile, polymethylmethacrylate and mixtures thereof. More preferably, a vinylidenefluoride/hexafluoropropylene copolymer having 8 to 25 wt % of hexafluoropropylene may be used.

The separator may be disposed between the cathode and the anode to form a battery assembly. The electrode assembly is wound or folded and then sealed in a cylindrical or rectangular battery case. Then, an organic electrolyte solution is injected into the battery case to complete the preparation of a lithium ion battery. Alternatively, a plurality of electrode assemblies may be stacked in a bi-cell structure and impregnated with an organic electrolyte solution. The resultant is put into a pouch and hermetically sealed, thereby completing a lithium ion polymer battery.

Figure 2:
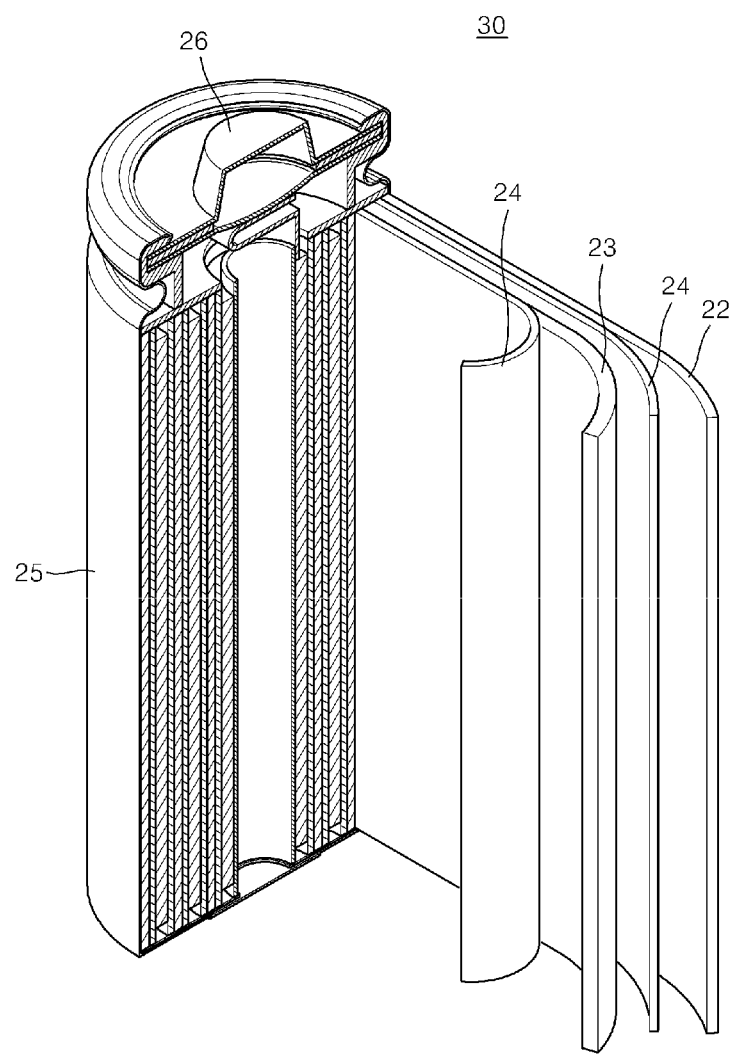
FIG. 2 is a schematic perspective view of a typical structure of a lithium battery according to an embodiment of the present invention.

FIG. 2 is a schematic perspective view of a typical structure of a lithium battery 30 according to an embodiment of the present invention. Referring to FIG. 2, the lithium battery 30 according to the present embodiment includes a cathode 23, an anode 22, a separator 24 disposed between the cathode 23 and the anode 22, and an electrolyte (not shown) impregnated into the cathode 23, the anode 22 and the separator 24, a case 25, and a sealing member 26 sealing the case 25. The lithium battery 30 is prepared by sequentially stacking the cathode 23, the anode 22 and the separator 24 upon one another, winding the stack in a spiral form, and inserting the wound stack in the case 25.

Hereinafter, one or more embodiments of the present invention will be described in more detail with reference to the following examples. However, these examples are not intended to limit the scope of the one or more embodiments of the present invention.

EXAMPLE 1

Si particles having a mean diameter of 0.1 μm are micellized by dispersing the Si particles together with 1 g of pyrrol (available from Aldrich) in 10 ml of ethanol, and then putting the Si particle in an aqueous solution containing 2% sodium dodecyl sulfate dispersing agent. 1 g of FeCl3 is added, stirred at 60° C. for 4 hours, polymerized, filtered, dried, and pulverized. Then, polypyrrol is carbonized by sintering the resulting material by using a hot blast stove at 800° C. for 1 hour under a nitrogen atmosphere. A composite anode active material is prepared by growing carbon nanotubes while putting the carbonized Si particles into a chamber under an argon atmosphere, and applying ethylene at 650° C. and 2 torr to the chamber.

As described above, according to the one or more of the above embodiments of the present invention, a composite anode active material is prepared using a method by which carbon nanotubes are grown without a separate process of applying a catalyst, and adherence between a Si particle and the carbon nanotubes is improved. Thus, a lithium battery using the composite anode active material may have excellent electrical properties.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing a composite anode active material, the method comprising:
   dispersing and micellizing a Si particle together with a polymerizable monomer in an organic solvent, thereby forming a dispersion solution;
   forming a carbon layer on the Si particle by applying a catalyst to the dispersion solution in which the Si particle is micellized, polymerizing the polymerizable monomer, and drying the polymerization product;
   sintering the Si particle on which the carbon layer is formed; and
   growing carbon nanotubes on the Si particle on which the carbon layer is formed, by providing a vaporized carbonaceous material.

2. The method of claim 1, wherein the sintering is performed at a temperature equal to or greater than 500° C. under an inert atmosphere.

3. The method of claim 1, wherein the polymerizable monomer comprises at least one selected from the group consisting of a pyrrol-based monomer, an acetylene-based monomer, a thiopene-based monomer, an aniline-based monomer, a fluorine-based monomer, an alkylthiopene-based monomer, a naphthalene-based monomer and a divinylbenzene-based monomer.

4. The method of claim 1, wherein the catalyst comprises a catalyst for polymerization and a catalyst for forming carbon nanotubes.

5. The method of claim 1, wherein the catalyst comprises at least one metal selected from the group consisting of nickel (Ni), cobalt (Co), iron (Fe), platinum (Pt), gold (Au), aluminium (Al), chromium (Cr), copper (Co), magnesium (Mg), manganese (Mg), molybdenum (Mo), rhodium (Rh), silicon (Si), tantalum (Ta), titanium (Ti), tungsten (W), uranium (U), vanadium (V), and zirconium (Zr), chlorides thereof, nitrides thereof, and oxides thereof.

6. The method of claim 1, wherein the organic solvent comprises at least one selected from the group consisting of methanol, ethanol, isopropanol, butanol, dimethylformamide (DMF), and N-methylpyrrolidone.

7. The method of claim 1, wherein the vaporized carbonaceous material comprises at least one selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

8. The method of claim 1, wherein the sintering is performed at a temperature in a range of 700° C. to 1500° C. under an inert atmosphere.

9. The method of claim 8, wherein the inert atmosphere is a nitrogen atmosphere, an argon atmosphere, or a helium atmosphere.

10. The method of claim 1, wherein the sintering is performed for 0.1 to 12 hours.

* * * * *